United States Patent
Horski et al.

[11] Patent Number: 5,614,775
[45] Date of Patent: Mar. 25, 1997

[54] TWO-SPEED DIRECT-CURRENT MOTOR WITH HIGH-SPEED ROTATION SWITCH ACTIVATED BY A VEHICLE SENSED PARAMETER SIGNAL

[75] Inventors: Marek Horski; Jerzy Muszynski, both of London, Canada

[73] Assignee: Siemens Electric Limited, Mississagua, Canada

[21] Appl. No.: 573,717

[22] Filed: Dec. 18, 1995

[51] Int. Cl.⁶ .................................................. H02K 11/00
[52] U.S. Cl. ................ 310/68 R; 310/68 B; 310/114; 310/140; 310/233; 310/264
[58] Field of Search .................. 310/68 R, 68 B, 310/136, 140, 143, 144, 114, 264, 233

[56] References Cited

U.S. PATENT DOCUMENTS

| | | | |
|---|---|---|---|
| 841,609 | 1/1907 | Alexanderson | 310/179 |
| 3,122,895 | 3/1964 | Woods | 62/184 |
| 3,293,876 | 12/1966 | Geisler | 62/184 |
| 3,613,391 | 10/1971 | Harter | 62/184 |
| 4,019,104 | 8/1977 | Barker | 318/195 |
| 4,025,808 | 5/1977 | Grengg et al. | 310/68 B |
| 4,088,852 | 5/1978 | Van Doren | 200/1 |
| 4,334,188 | 6/1982 | Dudley | 324/133 |
| 4,425,766 | 1/1984 | Claypole | 63/133 |
| 4,485,692 | 12/1984 | Moore et al. | 74/745 |
| 4,590,772 | 5/1986 | Nose et al. | 62/184 |
| 4,910,790 | 3/1990 | Kershaw | 388/836 |
| 5,285,650 | 2/1994 | Lin | 62/133 |
| 5,434,463 | 7/1995 | Horski | 310/248 |

Primary Examiner—Steven L. Stephan
Assistant Examiner—Tran N. Nguyen

[57] ABSTRACT

A two-speed direct-current electric motor with a high-speed rotation switch activated by a vehicular sensed parameter signal. The motor includes a motor shaft supported by at least one bearing for rotation, at least two sets of windings supported by the shaft, a contactor arrangement supported by the shaft to electrically couple the windings in first and second configurations based upon a sensed parameter signal having at least a first and a second state, and a commutator arrangement coupled to the contactor arrangement to apply electrical energy to the windings. The motor rotates at a first speed when the windings are coupled in the first configuration and rotates at a second speed when the windings are coupled in the second configuration. The high-speed rotation switch is coupled directly to a sensed parameter signal and is integral to the electric motor.

20 Claims, 3 Drawing Sheets

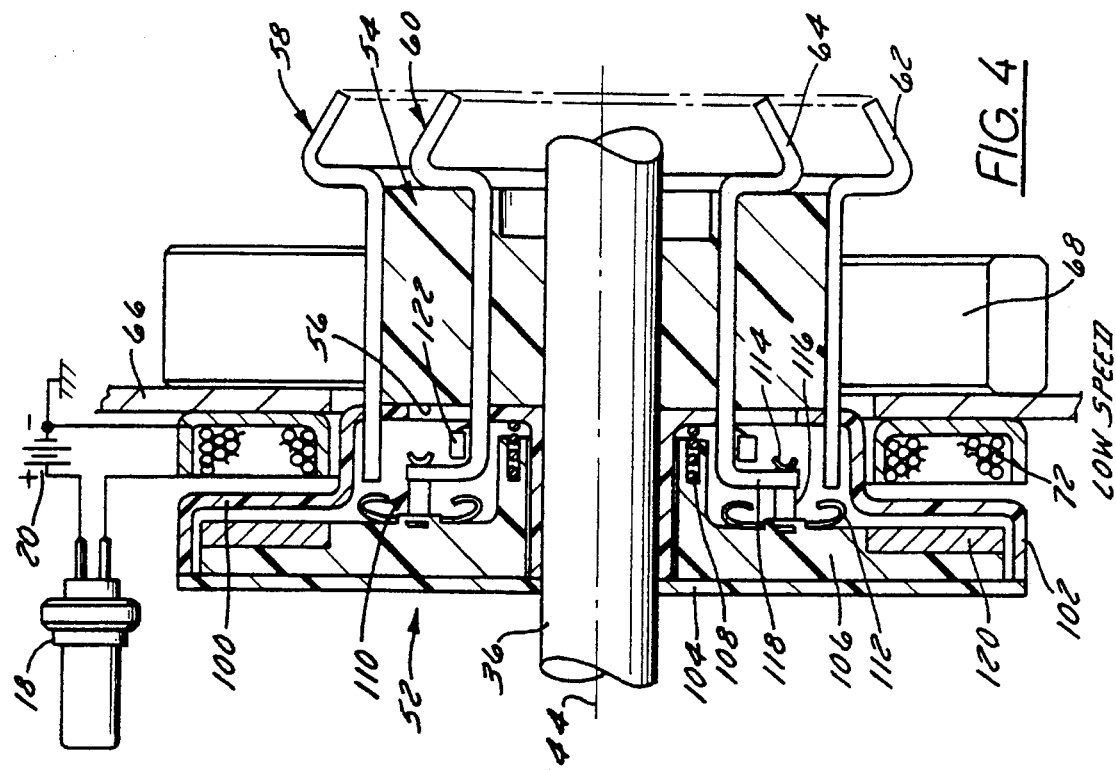
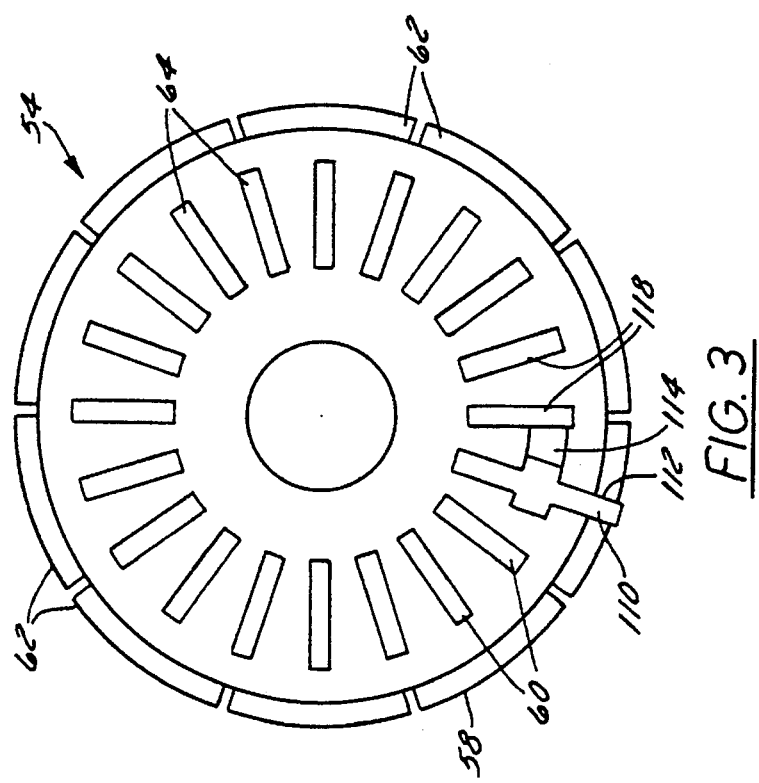

TWO-SPEED DIRECT-CURRENT MOTOR WITH HIGH-SPEED ROTATION SWITCH ACTIVATED BY A VEHICLE SENSED PARAMETER SIGNAL

FIELD OF THE INVENTION

The present invention relates to controlling a direct-current (DC) electric motor such as the motor which drives a fan for cooling a vehicle air conditioning condenser. In particular, the present invention relates to changing the speed of the motor based upon a sensed vehicle parameter such as the pressure or temperature of the condenser, wherein the motor speed is changed by reconfiguring the motor windings during operation.

BACKGROUND OF THE INVENTION

Vehicular air conditioning systems typically employ an air-cooled condenser for cooling and condensing the air conditioning refrigerant. An electric fan is used to enhance the flow of air across the condenser. Various methods for controlling the fan speed are known in the art. For example, U.S. Pat. No. 4,590,772 discloses a vehicular air conditioning system capable of adjusting draft volume across the radiator and condenser in response to air conditioner operating conditions. U.S. Pat. No. 5,285,650 discloses a controller which automatically turns off a condenser electric fan as the speed of the associated automobile surpasses a critical speed, or turns on the fan as the speed of the automobile drops below the critical speed. These references require relatively complicated control circuits and cabling external to the condenser fan motor.

Condenser fan speed controllers have also been used in refrigeration systems. For example, U.S. Pat. No. 3,122,895 discloses a condenser fan controller for a refrigeration system wherein a clutch disconnects the fan propeller shaft from a motor driven shaft when the condenser pressure drops below a certain value. U.S. Pat. No. 3,293,876 discloses a refrigeration system including control arrangement for regulating power input to the fan drive motor of an air-cooled condenser in response to the refrigeration load. U.S. Pat. No. 3,613,391 discloses a pressure-responsive motor speed control for maintaining minimum condenser pressure in a refrigeration system under varying ambient temperature and refrigeration load conditions.

Another type of fan speed controller used in vehicular air conditioning systems includes an automobile computer programmed to trigger a separate relay. The relay controls the flow of energy to a two-speed electric motor equipped with two brush sets and two commutator sets for low and high-speed rotation. The controller employs power resistors and regulators for varying motor speed. This design, however, has several disadvantages. First, the design is prone to failures leading to ineffective or unsafe conditions. For example, a computer failure may prevent the computer from commanding the relay to configure the fan for high-speed rotation at high condenser pressure or temperature. Also, controller reliability is lower due to the extra cabling and connections required between the car computer, relay and fan motor. Furthermore, the design is inefficient due to energy losses incurred by the power resistors and regulators. Finally, the design's two brush sets and two commutator sets increase the physical dimensions and weight of the motor.

Alternating-current motors in which the windings can be reconfigured by switches to vary the speed of rotation have been used. For example, U.S. Pat. No. 841,609 discloses a multi-speed alternating-current motor provided with windings which can be connected in various configurations. This alternating-current motor, however, cannot be used in direct-current applications such as vehicular air-conditioning systems.

Accordingly, it would be desirable to provide a safe and effective way to control the speed of a direct-current electric motor. It would also be useful to provide a direct-current electric motor with an integral (i.e., built-in) speed rotation switch directly activated by a vehicle sensed parameter signal, and a two-speed direct-current electric motor with a high-speed rotation switch which changes the motor speed by reconfiguring the motor windings during operation. It would also be desirable to provide a two-speed direct-current electric motor which drives a fan for cooling a vehicle air conditioning condenser based upon a sensed vehicle parameter such as the condenser pressure or temperature.

SUMMARY OF THE INVENTION

The present invention relates to a direct-current motor rotatable at first and second speeds in response to a sensed parameter signal having at least a first and a second state. In one embodiment, the motor includes a motor shaft supported by at least one bearing for rotation about a rotational axis, at least two sets of windings supported by the shaft for rotation about the rotational axis, and a contactor arrangement supported by the shaft for rotation about the rotational axis to electrically couple the windings in first and second configurations. The contactor is operated based upon the sensed parameter signal. The motor also includes a commutator arrangement coupled to the contactor arrangement to apply electrical energy to the windings. The motor rotates at the first speed when the windings are coupled in the first configuration and rotates at the second speed when the windings are coupled in the second configuration.

In another embodiment, the motor includes a motor shaft supported by at least one bearing for rotation about a rotational axis, an armature supported by the shaft for rotation about the rotational axis and wound with at least a first and a second set of windings, and an electromagnetic relay comprising a stationary relay coil and a plurality of relay contacts, the relay coil coupled to the sensed parameter signal and the relay contacts supported by the shaft for rotation about the rotational axis and in magnetic communication with the relay coil. The relay contacts are adapted to electrically couple the windings in at least two configurations in response to the sensed parameter signal. The motor also includes a commutator arrangement coupled to the relay to apply electrical energy to the windings, wherein the motor rotates at the first speed when the windings are coupled in the first configuration and rotates at the second speed when the windings are coupled in the second configuration.

In still another embodiment, the motor includes a motor shaft supported by at least one bearing for rotation about a rotational axis, an armature supported by the shaft for rotation about the rotational axis and containing at least one coil pair, and a contactor arrangement supported by the shaft for rotation about the rotational axis to electrically couple the coil pair in at least two configurations. The coil pair is coupled in the first configuration when the sensed parameter signal is in the first state and in the second configuration when the sensed parameter signal is in the second state. The motor also includes a commutator arrangement coupled to the coil pair and the contactor arrangement to apply electrical energy to the coil pair, the commutator arrangement having inner and outer shells. The motor rotates at the first speed when the coil pair is coupled in the first configuration and rotates at the second speed when the coil pair is coupled in the second configuration. The motor further includes a fixed brush mounted in sliding electrical contact with the outer shell of the commutator arrangement to provide electrical energy to the commutator arrangement, and a fixed magnet surrounding the coil pair.

BRIEF DESCRIPTION OF THE DRAWINGS

The present invention will become more fully understood from the following detailed description, taken in conjunction with the accompanying drawings, wherein like reference numerals refer to like parts, in which:

FIG. 3 is a top sectional view of the commutator arrangement.

FIG. 4 is a sectional view of a portion of the motor shown in FIG. 2 illustrating the high-speed rotation switch configured for low-speed rotation.

DETAILED DESCRIPTION OF THE PREFERRED EMBODIMENT

Figure 1:
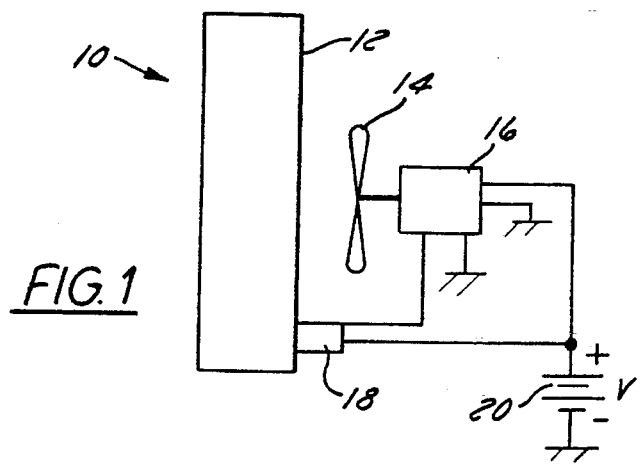
FIG. 1 is a block diagram showing a vehicular condenser cooling system in accordance with one embodiment of the present invention.

Referring to FIG. 1, a vehicular condenser cooling system 10 includes a condenser 12 for cooling and condensing a refrigerant or cooling medium (not shown) flowing through condenser 12. A fan 14 is arranged to enhance the flow of cooling air across condenser 12. Fan 14 is driven by a two-speed direct-current electric motor 16. The draft volume of air directed to condenser 12 by fan 14 increases when motor 16 is configured to rotate at high-speed, thereby increasing the cooling capacity of condenser 12.

Motor 16 is electrically coupled to a signal from condenser pressure sensor 18. Sensor 18 is mounted in or near condenser 12 in order to sense the pressure of the refrigerant flowing through condenser 12. When condenser pressure is high, sensor 18 closes a circuit and applies a voltage to motor 16. Although sensor 18 is a condenser pressure sensor in the preferred embodiment, the invention can use any sensor capable of generating a signal having at least a first and a second state. For example, sensor 18 could be a condenser temperature sensor or could be a sensor attached to a radiator. As explained in detail below, the speed configuration of motor 16 is based upon the state of the sensed parameter signal from sensor 18. Motor 16 is configured to rotate at a first speed when the sensed parameter signal from sensor 18 is in a first state and is configured to rotate at a second speed when the sensed parameter signal from sensor 18 is in a second state. Motor 16 receives electrical energy from vehicle battery 20.

Figure 2:
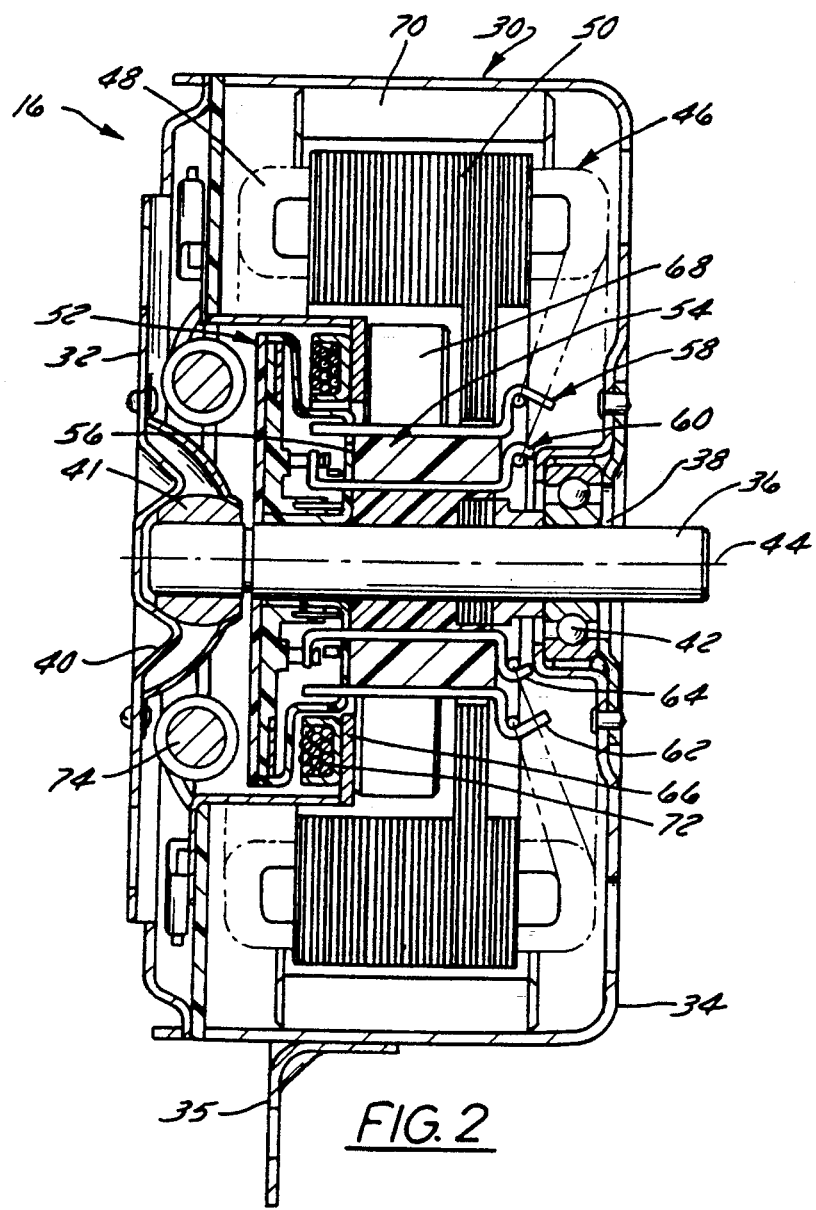
FIG. 2 is a sectional view of a two-speed direct current motor with a high-speed rotation switch.

Referring to FIG. 2 for a sectional view, motor 16 is enclosed in a casing 30 having a rear wall 32 and a front wall 34. Front wall 34 is integral with the sides of casing 30. A motor mounting bracket 35 is attached to casing 30 to mount motor 16 to a support (not shown) within the engine compartment of a vehicle. A motor shaft 36 is fit through an aperture 38 in the front wall 34 of casing 30. Motor shaft 36 is supported by sleeve bearing 40 and ball bearing 42 for rotation about a rotational axis 44. Bearing 40 includes a ball and socket joint 41 which allows motor shaft 36 to self-adjust, thereby simplifying manufacture.

Motor 16 has an armature 46 supported by motor shaft 36 for rotation about rotational axis 44. Armature 46 includes an armature core 48 wound with at least two sets of windings 50 occupying a similar location. A winding set may be referred to as a coil, and two winding sets may be referred to as a coil pair. The coils in a coil pair may have a similar or different number of turns (e.g., 10 turns) or use a similar or different gauge of wire (e.g., 18 gauge). A complete winding may contain any number of coil pairs (e.g., 20 coil pairs). Armature core 48 is made of a metal such as iron or steel.

Motor shaft 36 also supports a contactor arrangement 52 for rotation about rotational axis 44. Contactor arrangement 52 is press-fit onto motor shaft 36 and is secured to a commutator arrangement 54 along a flat surface 56. Commutator arrangement 54 is a dual shell commutator having two concentrically molded shells 58 and 60 concluded in reverse hooks. In a preferred embodiment, shown in the top cross section of FIG. 3, outer commutator shell 58 is divided into ten commutating bars 62 while inner commutator shell 60 contains twenty inner bars 64. Outer bars 62 have a sliding surface and are used for commutation, hence the name commutating bars, whereas inner bars 64 are used only for interconnecting coils 50. Returning to FIG. 2, coils 50 are wound such that one end of a coil is connected to an outer commutating bar 62 and the other end is connected to an inner bar 64. The connections between commutator arrangement 54 and armature coils 50 result in the reversal of electrical current applied to coils 50 when armature 46 rotates. As explained in detail below in reference to FIGS. 3–5, contactor arrangement 52 interacts with commutator arrangement 54 to electrically couple the two winding sets 50 in a first and a second configuration based upon a sensed parameter signal from sensor 18, thereby forming a high speed rotation switch.

A stationary brush card 66 mounted to the motor casing 30 provides support for a fixed brush 68. Brush 68 is preferably a high-speed crescent brush, such as that disclosed in U.S. Pat. No. 5,434,463, which makes sliding electrical contact with the outer shell 58 of commutator arrangement 54 to supply electrical current from battery 20 (FIG. 1) to the commutator arrangement.

Winding sets 50 are surrounded by permanent magnets 70 fixed to the motor casing 30. A motor 16 may have, for example, four magnets 70. Electric current from battery 20 flows through brush 68 into commutator arrangement 54 and then through winding sets 50 where it interacts with magnetic fields of fixed magnets 70 to produce torque which causes motor shaft 36 to rotate about rotational axis 44.

Motor 16 also includes a stationary electromagnet 72 secured to brush card 66. As explained in detail below in reference to FIGS. 4 and 5, electromagnet 72 is coupled to the sensed parameter signal from sensor 18 and is in magnetic communication with contactor arrangement 52 such that the sensed parameter signal is capable of energizing electromagnet 72 and causing contactor arrangement 52 to change the configuration of motor 16 from low-speed to high-speed rotation in response to high condenser pressure. Motor 16 also includes a choke 74.

Figure 5:
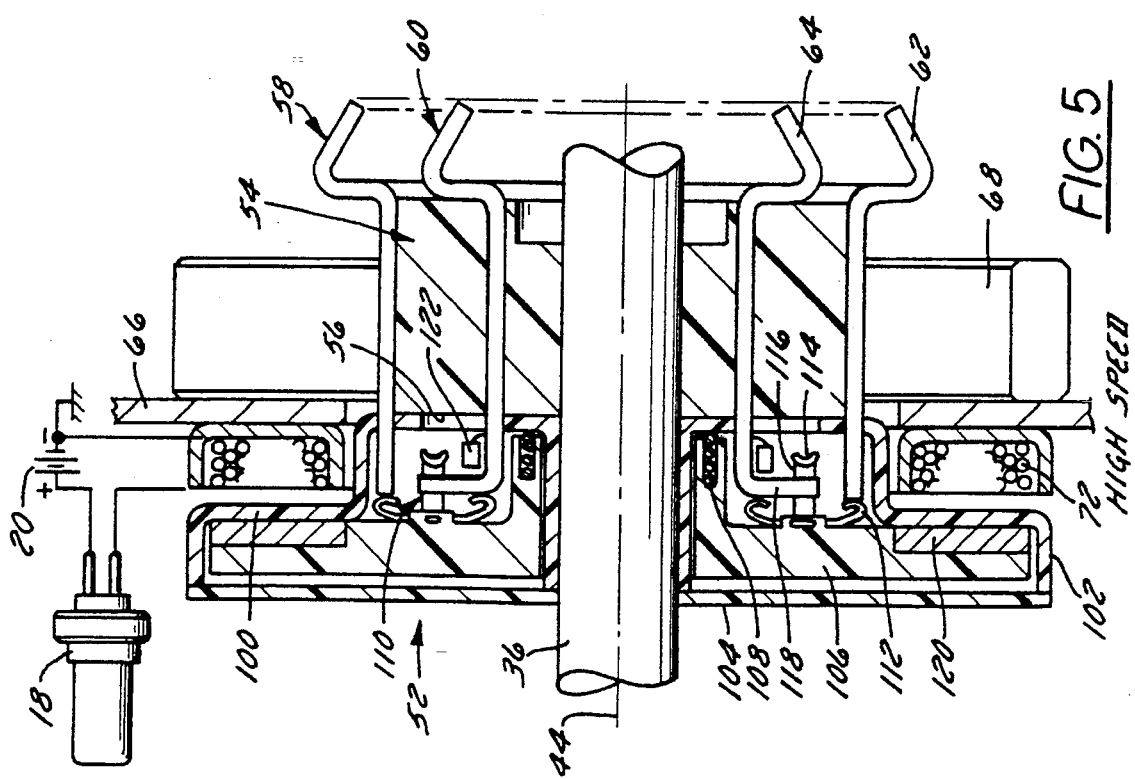
FIG. 5 is a sectional view like that of FIG. 4, except that the high-speed rotation switch is configured for high-speed rotation.

Turning to FIG. 4, contactor arrangement 52 includes a two-part housing 100 having a cup 102 and a lid 104. Housing 100 is sealed to increase the reliability of contactor arrangement 52 by preventing contamination by dust, dirt, water, oil, grease or other contaminants typically present in a vehicle engine environment. Housing 100 of contactor arrangement 52 is press-fit or keyed onto motor shaft 36 and secured (e.g., glued, screwed, riveted) to the flat surface 56 of commutator arrangement 54. Within housing 100 is a disk 106 in sliding engagement with the tubular part of cup 102 and maintained generally parallel with lid 104, whereby disk 106 can move in a direction parallel to motor shaft 36. Disk 106 can be slidably coupled to housing 100 using grooves in disk 106 and corresponding ribs on housing 100 to prevent rotation and maintain alignment of disk 106 within housing 100. Both housing 100 and disk 106 can be made of plastic, and are preferably made of polyester so that no lubrication is necessary. A spring 108, located within housing 100 of contactor arrangement 52, is coupled to disk 106 and biases disk 106 against lid 104. FIG. 4 shows disk 106 biased in the low-speed configuration of motor 16 while FIG. 5 shows disk 106 moved into the high-speed configuration of motor 16 by a mechanism described in detail below.

A set of relay contacts or cramps 110 are secured to the bottom of disk 106, preferably by molding or riveting contacts 110 directly onto disk 106. Contacts 110 have a first conductive member 112 and a second conductive member 114 coupled by a support 116. The first and second conductive members 112 and 114 are supported at right angles with respect to each other, and are movable between low-speed and high-speed positions as disk 106 moves. In the low-speed configuration of motor 16 shown in FIG. 4, first conductive member 112 makes no electrical contact between commutating bar 62 and inner bar 64 whereas second conductive member 114 makes electrical contact between bar tabs 118 of adjacent inner bars 64 (FIGS. 3–4). However, in the high-speed configuration of motor 16 shown in FIG. 5, first conductive member 112 makes electrical contact between commutating bar 62 and bar tab 118 of inner bar 64 whereas second conductive member 114 makes no electrical contact between bar tabs 118 of adjacent inner bars 64. The preferred embodiment uses ten copper contacts, but the number of contacts can change with the number of windings and other conductive materials (e.g., gold) can be used.

Contactor arrangement 52 includes a ferromagnetic (e.g., iron or steel) ring 120 secured to the bottom of disk 106 and aligned with electromagnet 72 along a direction parallel to the movement of disk 106 and generally perpendicular to the longitudinal axis of shaft 36. In the low-speed configuration of motor 16 shown in FIG. 4, the sensed parameter signal from sensor 18 is in a first state and no voltage is applied to electromagnet 72. Since de-energized electromagnet 72 does not generate a magnetic field, disk 106 is pressed against lid 104 by the bias of spring 108 and contacts 110 are in their low-speed positions. However, in the high-speed configuration of motor 16 shown in FIG. 5, the sensed parameter signal from sensor 18 is in a second state and a voltage from battery 20 is applied to electromagnet 72. Energized electromagnet 72 generates a magnetic field strong enough to attract ring 120 with a force sufficient to compress spring 108 and move disk 106 towards electromagnet 72. In this configuration, contacts 110 are moved into their high-speed positions.

In the preferred embodiment, capacitors 122 are connected between adjacent inner bars 64 to protect the relay contacts 110 from sparking.

Figure 6:
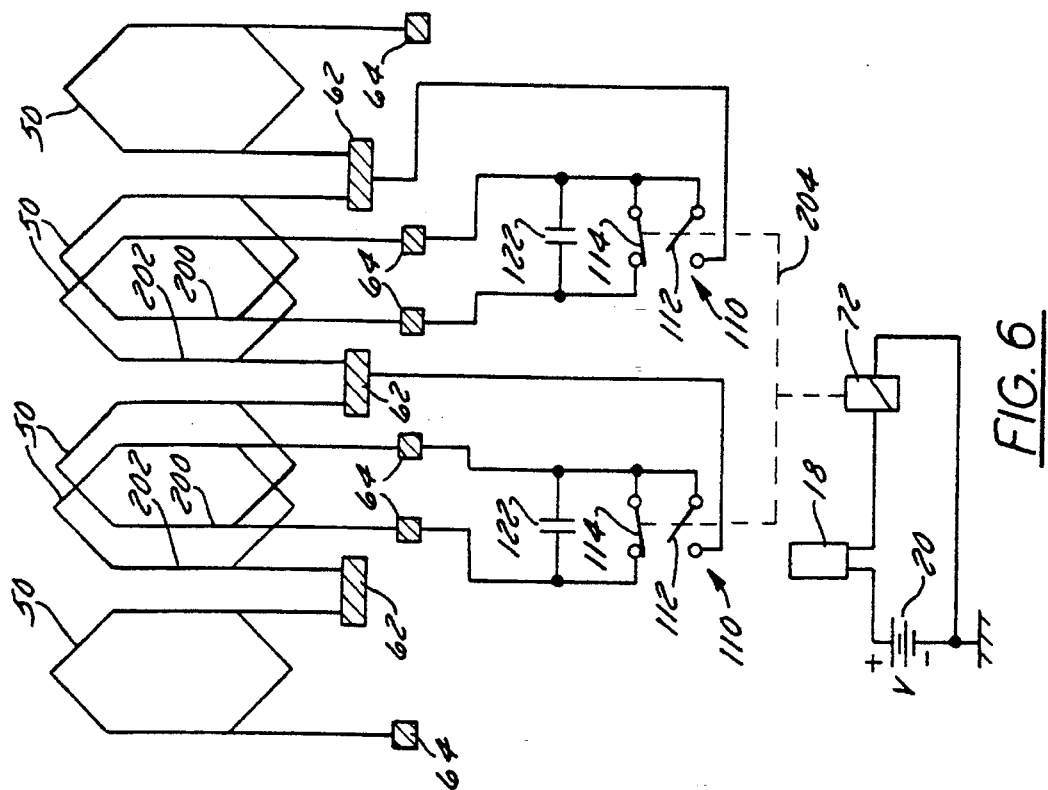
FIG. 6 is an electrical schematic diagram showing the high-speed rotation switch circuit.

FIG. 6 shows an electrical schematic diagram of the high-speed rotation switch and some of the windings 50 of coils 200 and 202 (for purposes of simplification, all of the windings 50 and all of the contacts 110 have not been shown). In the low-speed configuration of motor 16, the sensed parameter signal from sensor 18 is in a first state and no voltage is applied to electromagnet 72. With electromagnet 72 de-energized, first conductive member 112 makes no electrical contact between commutating bar 62 and inner bar 64 whereas second conductive member 114 makes electrical contact between adjacent inner bars 64. The first and second set of windings 50 are connected in series between adjacent commutating bars 62. The electrical path starts at a first commutating bar 62, goes through a first coil 200 to an inner bar 64, continues through second conductive member 114 to an adjacent inner bar 64, and then goes through a second coil 202 to a second commutating bar 62. However, in the high-speed configuration of motor 16, the sensed parameter signal from sensor 18 is in a second state and a voltage from battery 20 is applied to electromagnet 72. Magnetic field 204 switches the position of contacts 110 such that first conductive member 112 makes electrical contact between commutating bar 62 and inner bar 64 whereas second conductive member 114 makes no electrical contact between adjacent inner bars 64. Only one winding set 50 is connected between adjacent commutating bars 62 (i.e., winding sets 50 are connected in series). The electrical path starts at a first commutating bar 62, goes through first conductive member 112 to an inner bar 64, and continues through coil 202 to a second commutating bar 62. Since the high-speed configuration results in only a single winding set 50 being connected in series between commutating bars 62, this winding set can be made from a heavier gauge of wire than the other winding set.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. Although the preferred embodiments described above show a two-speed condenser motor controlled by a pressure sensor for use in a vehicular air conditioning system, the multi-speed motor could be used in any other direct-current motor application requiring different rotation speeds in response to a control signal. For example, an electric motor incorporating the invention could be used in a refrigeration system, or the sensed parameter could be a temperature or other sensed parameter having different states. Additionally, an electric motor incorporating the present invention could also be a direct-current electric motor having more than two speeds in response to a control signal having more than two states.

What is claimed is:

1. A direct-current motor rotatable at first and second speeds in response to a sensed parameter signal having at least a first and a second state, the motor comprising:

a motor shaft supported by at least one bearing for rotation about a rotational axis;

at least two sets of windings supported by the shaft for rotation about the rotational axis;

a contactor arrangement supported by the shaft for rotation about the rotational axis to electrically couple the windings in first and second configurations, wherein the contactor is operated based upon the sensed parameter signal; and a commutator arrangement coupled to the contactor arrangement to apply electrical energy to the windings, wherein the motor rotates at the first speed when the windings are coupled in the first configuration and rotates at the second speed when the windings are coupled in the second configuration.

2. The motor of claim 1, wherein the contactor arrangement comprises a switch which connects the windings in the first configuration when the sensed parameter signal is in the first state and connects the windings in the second configuration when the sensed parameter signal is in the second state.

3. The motor of claim 2, wherein the first state of the sensed parameter signal corresponds to the absence of an applied voltage and the second state of the sensed parameter signal corresponds to the presence of an applied voltage.

4. The motor of claim 2, wherein the contactor arrangement further comprises a sealed housing containing the switch.

5. The motor of claim 1, wherein the windings are connected in series in the first configuration and in series in the second configuration.

6. The motor of claim 1, wherein the commutator arrangement has an inner and an outer shell.

7. A direct-current motor rotatable at first and second speeds in response to a sensed parameter signal having at least a first and a second state, the motor comprising:

a motor shaft supported by at least one bearing for rotation about a rotational axis;

an armature supported by the shaft for rotation about the rotational axis, the armature wound with at least a first and a second set of windings;

an electromagnetic relay comprising a stationary relay coil and a plurality of relay contacts, the relay coil coupled to the sensed parameter signal and the relay contacts supported by the shaft for rotation about the rotational axis and in magnetic communication with the relay coil, the relay contacts adapted to electrically couple the windings in at least two configurations in response to the sensed parameter signal; and a commutator arrangement coupled to the relay to apply electrical energy to the windings, wherein the motor rotates at the first speed when the windings are coupled in the first configuration and rotates at the second speed when the windings are coupled in the second configuration.

8. The motor of claim 7, wherein the commutator arrangement comprises a plurality of commutating bars, and wherein the first and second set of windings are connected in series between two commutating bars when the relay is not energized by the sensed parameter signal, and only the first set of windings is connected between two commutating bars when the relay is energized.

9. The motor of claim 8, wherein the first set of windings uses a heavier gauge of wire than the second set of windings.

10. The motor of claim 8, wherein the commutator arrangement further comprises a plurality of inner bars, and one end of each winding is connected to a commutator bar and the other end is connected to an inner bar.

11. The motor of claim 7, wherein the relay contacts are mounted inside a housing sealed against contamination.

12. A direct-current motor rotatable at first and second speeds in response to a sensed parameter signal having at least a first and a second state, the motor comprising:

a motor shaft supported by at least one bearing for rotation about a rotational axis;

an armature supported by the shaft for rotation about the rotational axis, the armature containing at least one coil pair;

a contactor arrangement supported by the shaft for rotation about the rotational axis to electrically couple the coil pair in at least two configurations, wherein the coil pair is coupled in the first configuration when the sensed parameter signal is in the first state and in the second configuration when the sensed parameter signal is in the second state;

a commutator arrangement coupled to the coil pair and the contactor arrangement to apply electrical energy to the coil-pair, the commutator arrangement having inner and outer shells, wherein the motor rotates at the first speed when the coil pair is coupled in the first configuration and rotates at the second speed when the coil pair is coupled in the second configuration;

a fixed brush mounted in sliding electrical contact with the outer shell of the commutator arrangement to provide electrical energy to the commutator arrangement; and a fixed magnet surrounding the coil pair.

13. The motor of claim 12, wherein the coil pair comprises a first and a second coil having a different number of turns.

14. The motor of claim 12, wherein the coil pair comprises a first and a second coil having a different gauge of wire.

15. The motor of claim 12 further comprising a stationary electromagnet coupled to the sensed parameter signal, the electromagnet de-energized when the sensed parameter signal is in the first state and energized when the sensed parameter signal is in the second state, the electromagnet being in magnetic communication with the contactor arrangement.

16. The motor of claim 15, wherein the contactor arrangement further comprises:

a housing comprising a cup and a lid, whereby the housing is sealed against contamination;

a disk located inside the housing in parallel with the lid, the disk in sliding engagement with the tubular part of the cup, whereby the disk is movable in a direction parallel to the shaft;

a spring coupled to the disk, the spring biased to press the disk against the lid;

a plurality of contacts secured to the bottom of the disk and aligned with the shells of the commutator arrangement;

a ferromagnetic ring secured to the bottom of the disk and aligned with the electromagnet, wherein the electromagnet in its energized state attracts the ring with a force sufficient to compress the spring and move the disk toward the electromagnet so that the contacts disconnect the coils from the first configuration and connect the coils in the second configuration.

17. The motor of claim 16, wherein the housing is made of plastic.

18. The motor of claim 12, wherein the inner shell of the commutator arrangement comprises a plurality of inner bars and the outer shell of the commutator arrangement comprises a plurality of commutating bars.

19. The motor of claim 18, wherein the coil pair is connected in series between two commutating bars in the first configuration and only one coil is connected between two commutating bars in the second configuration.

20. The motor of claim 18, wherein a capacitor is connected between adjacent inner bars to prevent sparking on the contacts.

* * * * *